United States Patent [19]

Bowes et al.

[11] Patent Number: 4,585,546
[45] Date of Patent: Apr. 29, 1986

[54] HYDROTREATING PETROLEUM HEAVY ENDS IN AROMATIC SOLVENTS WITH LARGE PORE SIZE ALUMINA

[75] Inventors: Emmerson Bowes, Hopewell; Malvina Farcasiu; Eric J. Y. Scott, both of Princeton, all of N.J.

[73] Assignee: Mobil Oil Corporation, New York, N.Y.

[21] Appl. No.: 490,075

[22] Filed: Apr. 29, 1983

[51] Int. Cl.$^4$ .................. C10G 45/00; C10G 45/04
[52] U.S. Cl. ................... 208/253; 208/213; 208/216 PP; 208/238; 208/300
[58] Field of Search ............ 208/213, 253, 251 H, 208/216 PP, 238, 300

[56] References Cited

U.S. PATENT DOCUMENTS

| | | | |
|---|---|---|---|
| 3,576,737 | 4/1971 | Mitchell | 208/251 H |
| 3,891,541 | 6/1975 | Oleck | 208/251 H |
| 4,035,287 | 7/1977 | Espenscheid et al. | 208/242 |
| 4,045,331 | 8/1977 | Ward | 208/213 |
| 4,089,774 | 5/1978 | Oleck et al. | 208/89 |
| 4,192,736 | 3/1980 | Kluksdahl | 208/251 H |
| 4,212,729 | 7/1980 | Hensley, Jr. et al. | 208/216 PP |
| 4,225,421 | 9/1980 | Hensley, Jr. et al. | 208/251 H |
| 4,227,995 | 10/1980 | Sze et al. | 208/251 H |
| 4,267,033 | 5/1981 | Heck et al. | 208/216 PP |
| 4,271,042 | 6/1981 | Oleck et al. | 252/439 |
| 4,317,712 | 3/1982 | Farcasiu | 208/46 |
| 4,329,221 | 5/1982 | Farcasiu et al. | 208/251 H |
| 4,351,717 | 9/1982 | Jaffe | 208/216 PP |
| 4,382,877 | 5/1983 | Kehl | 208/216 PP |

FOREIGN PATENT DOCUMENTS 261520  5/1963  Australia ........................ 208/253

Primary Examiner—Andrew H. Metz
Assistant Examiner—Helane Wyers
Attorney, Agent, or Firm—Alexander J. McKillop; Michael G. Gilman; James F. Powers, Jr.

[57] ABSTRACT

Residual oils containing metals and sulfur are demetallized and desulfurized by adding to the oil an aromatic solvent and contacting the mixtures in the presence of hydrogen with an alumina having an average pore size greater than about 220 Angstroms.

9 Claims, No Drawings

HYDROTREATING PETROLEUM HEAVY ENDS IN AROMATIC SOLVENTS WITH LARGE PORE SIZE ALUMINA

BACKGROUND OF THE INVENTION

This invention is concerned with catalytic processes for demetalizing and desulfurizing petroleum oils, particularly the heavy petroleum ends and residual fractions with undesirably high metals and/or sulfur and/or Conradson carbon residue contents.

DESCRIPTION OF THE PRIOR ART

Residual petroleum oil fractions produced by atmospheric or vacuum distillation of crude petroleum are characterized by relatively high metals and sulfur content. This comes about because practically all of the metals present in the original crude become concentrated in the residual fraction and a disproportionate amount of sulfur in the original crude oil also remains in the residual fraction. Principal metal contaminants are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. The metal contaminants deposit on the special catalysts for these processes and cause the premature aging of the catalyst and/or formation of in ordinate amounts of coke, dry gas and hydrogen.

U.S. Pat. No. 4,035,287 discloses a method for desulfurizing oils which comprises contacting the oil with a solvent selective for low molecular weight aromatics thereby producing a low-sulfur, high-metals content raffinate and a low-metals, high-sulfur metals extract. The raffinate is then separated from the extract. U.S. Pat. No. 4,271,042 discloses a process for removing metal and sulfur contaminants from oil fractions by catalytic contact with specified metal sulfides or oxides supported on an alumina that contains at least 45% of its pore volume in pores of 30–150 Angstroms in diameter. These two patents are incorporated herein by reference.

SUMMARY OF THE INVENTION

It has now been found that a hydrocarbon oil containing both metals and sulfur contaminants may be effectively demetalized and desulfurized by adding to the oil a selected aromatic solvent and subsequently contacting the oil with hydrogen and with an alumina having an average pore size diameter of 220 or greater Angstrom units under conditions sufficient to effect demetalation and desulfurization.

DESCRIPTION OF THE INVENTION

The hydrocarbon feed to the process of this invention can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling about 650° F. and containing a substantial quantity of asphaltic materials. Thus, the charge stock can be one having an initial or 5 percent boiling point somewhat below 650° F., provided that a substantial proportion, for example, about 70 or 80 percent by volume, of its hydrocarbon components boils about 650° F. A hydrocarbon stock having a 50 percent boiling point of about 900° F. and which contains asphaltic materials, 4% by weight sulfur and 51 ppm nickel and vanadium is illustrative of such charge stock.

The charge stock is mixed with an aromatic solvent which can be benzene, toluene, other substituted benzenes, light cycle oils, and other aromatic streams derived from refinery operations. The volumetric ratio of aromatic solvent to residual oil can be between 0.5 and about 10. The volumetric ratio of aromatic solvent to feed preferably is between 1:1 and 3:1. The mixture is then charged to a catalyst bed along with hydrogen under conditions conducive to demetalation and desulfurization.

Generally, all of the catalysts comprise a hydrogenation component composited with an alumina support. The hydrogenating component of the class of catalysts disclosed herein can be any material or combination thereof that is effective to hydrogenate and desulfurize the charge stock under the reaction conditions utilized. For example, the hydrogenating component can be at least one member of the group consisting of Group VI and Group VIII metals in a form capable of promoting hydrogenation reaction. Especially effective catalysts for the purposes of this invention are those comprising molybdenum and at least one member of the iron group metals. Preferred catalysts of this class are those containing about 2 to about 10 percent by weight cobalt and about 5 to about 20 percent by weight molybdenum, but other combinations of iron group metals and molybdenum such as iron, nickel and molybdenum, as well as combinations of nickel and molybdenum, cobalt and molybdenum, nickel and tungsten or other Group VI or Group VIII metals of the Periodic Table taken singly or in combination can be used. The hydrogenating components of the catalysts of this invention can be employed in sulfided or unsulfided form.

The alumina support will be one wherein the average pore size is greater than 220 Angstrom units. Such alumina supports are known to those skilled in the art. For Example, such alumina supports are made by calcining alpha alumina mono-hydrates and/or pseudo boehmite at the proper temperature and period of time to achieve a desired average pore size diameter.

Typical process conditions may be defined as contacting a metal and/or sulfur and/or CCR contaminant containing charge stock with this invention's catalyst under a hydrogen pressure of about 300 to 3000 psig at 600° to 850° F. temperature, and 0.1 to 5 LHSV (i.e., 0.1 to 5 volumes of charge stock per volume of catalyst per hour).

The hydrogen gas which is used during the hydrodemetalation, hydrodesulfurization, and CCR removal is circulated at a rate between about 1,000 and 15,000 s.c.f./bbl of feed and preferably between about 2,000 and 8,000 s.c.f./bbl. The hydrogen purity may vary from about 60 to 100 percent. If the hydrogen is recycled, which is customary, it is desirable to provide for bleeding of a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

For the purpose of this invention, it is preferred to use catalyst particles such as 1/32-inch extrudate or the equivalent disposed in fixed beds.

Although this method of demetalation and desulfurization is useful in a continuous flow system it can also be utilized in batch processes in which the aromatic solvent or aromatic refinery stream, residual oil and alumina are contacted in the proportions previously discussed and for periods up to one-half to 4 hours.

EXAMPLES

Tests were run with five heavy oil samples of the following sulfur, nitrogen and nickel and vanadium content.

TABLE 1
PROPERTIES OF FEEDS

| Sample | | Wt % S | ppm Ni | ppm V |
| --- | --- | --- | --- | --- |
| A | Arab Lt. Vac. Resid | 4.0 | 17 | 70 |
| B | Cold Lake Atm. Resid, Light Cycle Oil | 2.3 | 24 | 57 |
| C | Arab Hvy. Topped Crude | 3.5 | 18 | 60 |
| D | Arab Hvy. Resid, Light Cycle Oil | 2.3 | 15 | 40 |
| E | Arab Hvy. Resid | 5.2 | 45 | 145 |

The A and E samples were mixed with ortho-xylene in ratios of 1:8 and 1:4 respectively. In the B and D samples the resids were mixed with an aromatic light cycle oil in a ratio of 1 to 3. Sample C was a blank run without any aromatics added.

The samples were demetalized and desulfurized by pressuring them in an autoclave for one hour at 350° C. and 1000 psi. The partial pressure of hydrogen was 1000 psig at 25° C. Results are shown below in Table 2.

TABLE 2
DESULFURIZATION AND DEMETALATION OF PETROLEUM RESIDS IN AROMATICS SOLVENTS

| Run | | % Removed S | % Removed Ni | % Removed V | $H_2$ consumption scft/barrel[1] |
| --- | --- | --- | --- | --- | --- |
| | Arabian Light Vac. Resid in o-xylene | | | | |
| (1) | HSD 1441[4] | 65 | 58 | 77 | (1107) |
| (2) | LPS Catalyst[5] | 67 | 99 | 98 | (576) |
| | Cold Lake Amt. Resid, LCO | | | | |
| (3) | HDS 1441[4] | 70 | 77 | 67 | 532 |
| (4) | LPS[5] | 72 | 93 | 96 | 468 |
| | Arabian Heavy Topped Crude | | | | |
| (5) | HDS 1441[4] | 43 | 39 | 35 | 494 |
| (6) | LPS[5] | 29 | 59 | 50 | 338 |
| | Arabian Heavy Resid Cycle Oil[2] | | | | |
| (7) | HDS 1441[4] | 53 | 67 | 50 | — |
| (8) | LPS[5] | 53 | 89 | 93 | 367 |
| | Arabian Heavy Resid in o-xylene | | | | |
| (9) | HDS 1441[4] | 49 | 49 | 38 | (802) |
| (10) | LPS[5] | 59 | 98 | 97 | (343) |

[1] Numbers in parenthesis are scft/bbl of resid when solvent is unreactive
[3] LCO = Light Cycle Oil
[4] HDS 1441 catalyst average pore 70-80 Å
[5] LPS catalyst average pore 220 Å

In Runs (1), (3), (5), (7) and (9) the catalyst was a commercial in hydrodesulfurization catalyst having an average pore size diameter of 70–80 Angstroms.

In runs (2), (4), (6), (8) and (10) the catalyst used in the process of this invention, an alumina catalyst of an average pore size of 220 Angstroms.

In comparing runs (2), (4), (8) and (10) to runs (1), (3), (7) and (9), it is readily apparent that the samples were more readily demetalized by the large pore catalyst without any drop in desulfurization. It should be noted in runs (5) and (6) demetalation was not nearly as effective in the absence of aromatic solvent.

It will be readily apparent to those skilled in the art that the effluent product obtained from contacting the charge stock with aromatic solvents and hydrogen can be fractionated into a product stream of residual oil having a greatly reduced sulfur and metals content.

What is claimed is:

1. A process for demetallizing and desulfurizing a residual oil which comprises:
    (a) adding to said residual oil an aromatic solvent selected from the group consisting of benzene, toluene, xylene and light cycle oil reformates;
    (b) passing the resulting mixture of residual oil and solvent together with hydrogen in contact with a catalyst consisting essentially of calcined alumina having an average pore size diameter greater than about 220 Angstroms; and
    (c) recovering from the resulting product stream a residual oil having a substantially reduced sulfur and metal content.

2. The process of claim 1, wherein the calcined alumina is selected from the group consisting of calcined alumina mono-hydrates and pseudo boehmite.

3. The process of claim 2, wherein the calcined alumina is calcined pseudo boehmite.

4. The process of claim 1 wherein the step of passing (b) is conducted at a temperature between about 300° C. and about 425° C.

5. The process of claim 1 wherein the step of passing (b) is conducted at an LHSV between about 0.1 and about 5.

6. The process of claim 1 wherein said step of passing in (b) is conducted at a hydrogen pressure of between about 300 and about 3000 psig.

7. The process of claim 1 wherein the volumetric ratio of aromatic solvent to residual oil is between about 0.5 and about 10.

8. The process of claim 1 wherein said process is conducted as a batch process.

9. The process of claim 1 wherein the period of contact time is between about one-half and about 4 hours.

* * * * *